United States Patent [19]
Ahn

[11] Patent Number: 6,166,783
[45] Date of Patent: Dec. 26, 2000

[54] FRONT CASE STRUCTURE OF CRT DISPLAY DEVICE

[75] Inventor: Hae-Won Ahn, Kyungki-do, Rep. of Korea

[73] Assignee: SamSung Electronics Co., Ltd., Kyungki-do, Rep. of Korea

[21] Appl. No.: 08/985,544

[22] Filed: Dec. 5, 1997

[30] Foreign Application Priority Data

Dec. 5, 1996 [KR] Rep. of Korea ...................... 96-62045

[51] Int. Cl.⁷ ..................................................... H04N 5/64
[52] U.S. Cl. ............................................. 348/836; 312/7.2
[58] Field of Search .................................. 312/7.2, 223.1, 312/223.2, 263, 265.5; 348/836, 839, 842, 843

[56] References Cited

U.S. PATENT DOCUMENTS

| | | |
|---|---|---|
| 4,360,838 | 11/1982 | Babicz et al. ........................ 348/836 X |
| 4,489,993 | 12/1984 | Hasegawa et al. . | |
| 5,359,421 | 10/1994 | Maeda ................................. 348/836 X |
| 5,363,150 | 11/1994 | Kojima . | |
| 5,419,626 | 5/1995 | Crockett . | |
| 5,532,546 | 7/1996 | Horiuchi . | |
| 5,623,391 | 4/1997 | Chase et al. .......................... 312/7.2 X |
| 5,661,630 | 8/1997 | Levins et al. . | |
| 5,673,982 | 10/1997 | Chase et al. . | |
| 5,742,359 | 4/1998 | Han ....................................... 348/836 |

*Primary Examiner*—Anthony Knight
*Assistant Examiner*—Karlena D. Schwing
*Attorney, Agent, or Firm*—Robert E. Bushnell, Esq.

[57] ABSTRACT

A CRT display device having a cathode ray tube for displaying an image, includes a front case having plural fixing bosses for mounting the cathode ray tube therein and four sides defining a display area; a deflection preventing rib, formed on each side of the front case, for minimizing a gap between the cathode ray tube and the front case; and a CRT chassis for fixing the cathode ray tube to the fixing bosses. Each deflection rib is made up of a first portion for receiving a pressing force from the installation of the cathode ray tube and a second portion for generating a reaction force against the front surface of the cathode ray tube. The first and second portions forming a profile comparable to the outer surface of the cathode ray tube.

14 Claims, 6 Drawing Sheets

FRONT CASE STRUCTURE OF CRT DISPLAY DEVICE

CLAIM OF PRIORITY

This application makes reference to, incorporates the same herein, and claims all benefits accruing under 35 U.S.C §119 from an application entitled *FRONT CASE STRUCTURE OF CRT DISPLAY DEVICE* earlier filed in the Korean Industrial Property Office on Dec. 5, 1996, and there duly assigned Serial No. 96-62045 by that office.

BACKGROUND OF THE INVENTION

1. Field of the Invention

The present invention relates to Cathode Ray Tube (CRT)-type display devices and, more particularly, to the structure of a front case for mounting the CRT assembly, in which a gap between the front case and the screen of the CRT is eliminated using four ribs abutting the fixing band of the CRT.

2. Description of the Related Art

In designing a front cover for a cathode ray tube, it is desirable to minimize the gap between the cathode ray tube and the front cover to prevent dirt and dust from accumulating therebetween. A front cover that snugly fits onto a cathode ray tube leaving as small a gap as possible is the goal in designing front cover assemblies. For example, U.S. Pat. No. 5,419,626 for a *Computer Housing Seal* to Crockett discloses an elastomeric overmold seal that is disposed along the peripheral of the cathode ray tube display in order to keep contaminants out from between the cathode ray tube and the cover. However, design in Crockett is difficult to manufacture since different materials are employed. In addition, the application remains silent as to the gap resulting between the cathode ray tube and the front cover.

U.S. Pat. No. 5,532,546 for a *Color Selecting Electrode Mounting Frame For CRT And Process For Production Of Same* to Horiuchi discloses a frame for a cathode ray tube that contains an L-sectional shape to match the curved profile of the glass surface of a CRT. The L-shaped profile is continuous along the edges of the frame and thus lacks the flexibility needed for a snug fit. Also, the curvature must be carefully made to exactly match the surface of a cathode ray tube to be effective. I have not seen a front cover with an L-shaped profile that actually flexes to the shape to the cathode ray tube, snugly fitting the cover onto the CRT and minimizing the gap between the front cover and the CRT.

SUMMARY OF THE INVENTION

It is an object of the present invention to provide a front case structure of a CRT display device whereby a gap between the front case and a CRT display device whereby a gap between the front case and a CRT assembly mounted thereto is reduced.

Another object of the present invention is to provide a CRT display device in which structural strength and good outer appearance is achieved with simple production techniques.

Yet another object is to provide a front cover for a cathode ray tube that actually flexes to conform to the shape of the cathode ray tube, thus providing a snug fit and thus reducing the gap between the cover and the CRT.

To achieve these and other advantages and in accordance with the propose of the present invention, as embodied and broadly described, there is provided a CRT display device having a cathode ray tube for displaying an image, comprising a front case having plural fixing bosses for mounting the cathode ray tube therein and four sides defining a display area, and a deflection preventing rib, formed on each side of the front case, for minimizing a gap between the cathode ray tube and the front case.

BRIEF DESCRIPTION OF THE ATTACHED DRAWINGS

A more complete appreciation of the invention, and many of the attendant advantages thereof, will readily apparent as the same becomes better understood by reference to the following detailed description when considered in conjunction with the accompanying drawings in which like reference symbols represent the same or similar components, wherein.

DETAILED DESCRIPTION OF THE PREFERRED EMBODIMENT

Figure 1:
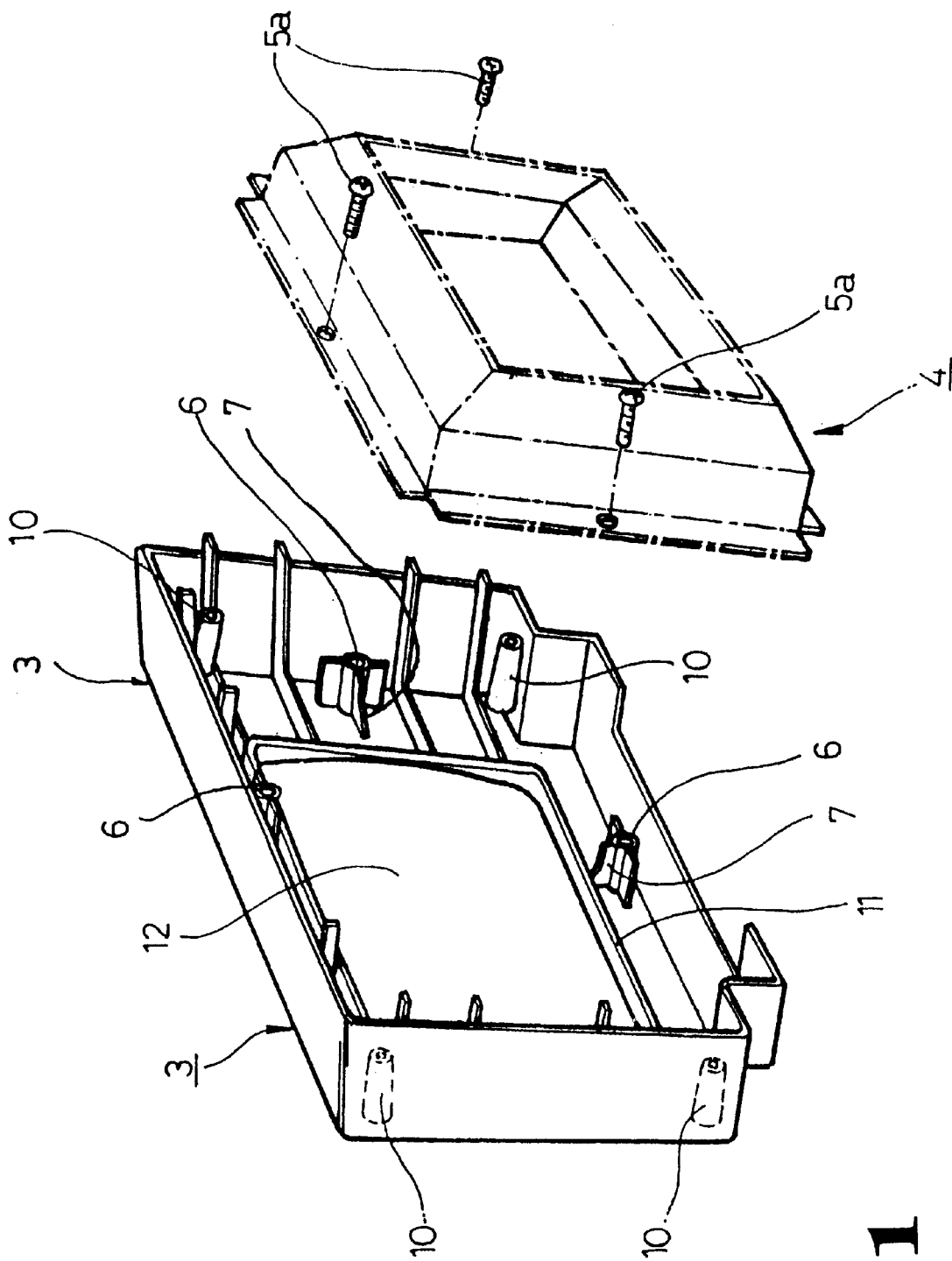
FIG. 1 and FIG. 2 are a front view and cross-sectional side view of a conventional display device, respectively.
Figure 2:
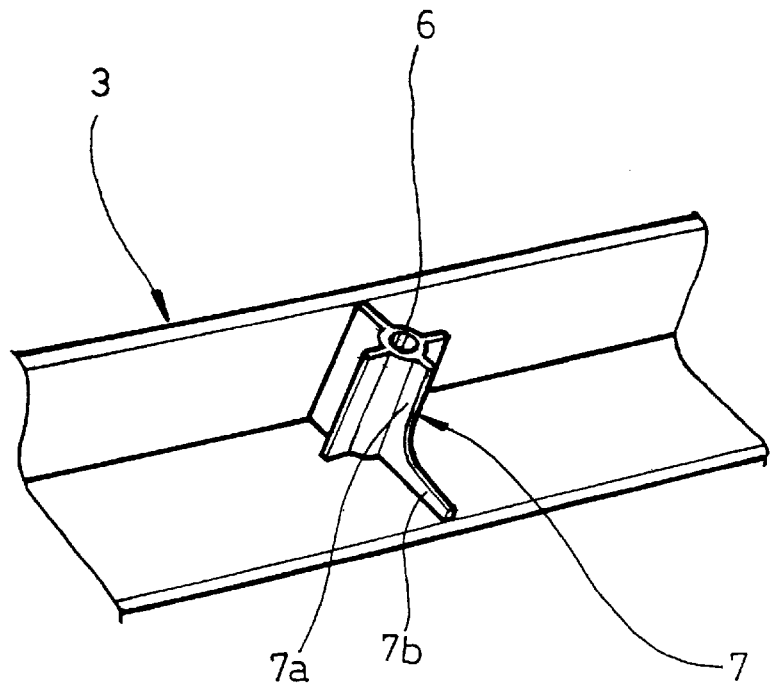

In FIGS. 1 and 2, a general CRT type display device is shown in a partially assembled state, in which a cathode ray tube (CRT) assembly 23 for displaying images is mounted to a rectangular front case 20. The CRT assembly 23, having four ears 23*a* formed at each corner of a central display area 20*a*, is fixed to the front case 3, which has four bosses 22 formed in its corresponding corners, using coupling screws 24. Thus, a display area 20*a* of a CRT screen 23*b* is exposed through front case 3.

When the CRT 23 assembly, constructed of heavier and more rigid materials, is installed on front case 3, which is much lighter and made of synthetic resins, the resulting front case is deflected due to the weight of the CRT assembly. Also, during the extrusion molding process used to make front case 3, the synthetic resin employed suffers from shrinkage stress.

In an assembled state, as shown in FIG. 2, the shrinkage stress imposed on the front case 3 causes a gap S in the contact region of the curved surface between CRT screen 23*b* and mating surface 20*c* of front case 3. The gap S is created by the CRT assembly 23 making contact with the four contact sides 20*b* which define the display area 20*a*, such that the gap is greatest at the center of the display area.

Therefore, the front case 3 cannot maintain structural strength along its sides and thus experiences severe deflection at the center of each side. The gap also allows foreign (dust) particles to enter the system and result in a poor appearance from the outside of the display device. Over time, the gap worsens due to ambient conditions such as temperature and humidity.

The gap can be minimized during assembly by the careful regulation of the torque applied to the coupling screws 24.

Excessive torque conditions create large gaps, while too little torque results in a loose coupling and potentially defective assembly. Strict torque requirements are difficult to control in a large-scaled production line.

Figure 3:
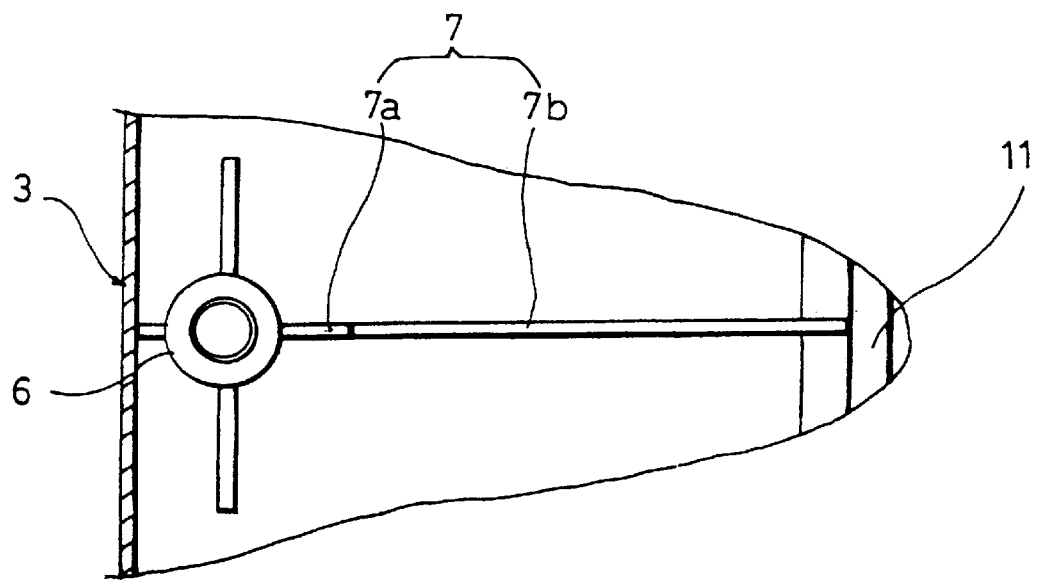
FIG. 3 is an exploded perspective view of a front case and CRT chassis for use in a display device according to the present invention.

As shown in FIG. 3, front case 3 has four sides in the form of CRT contact surfaces, or inner edges, 11 which define display area 12, and a plurality of mounting bosses 10 positioned at the corners thereof. Deflection preventing rib 7 and fixing boss, or plug, 6 are integrally formed with front case 3, adjacent to each CRT contact surface 11. CRT chassis 4 mounts to each fixing boss 6 using first fixing screws 5a.

Figure 4:
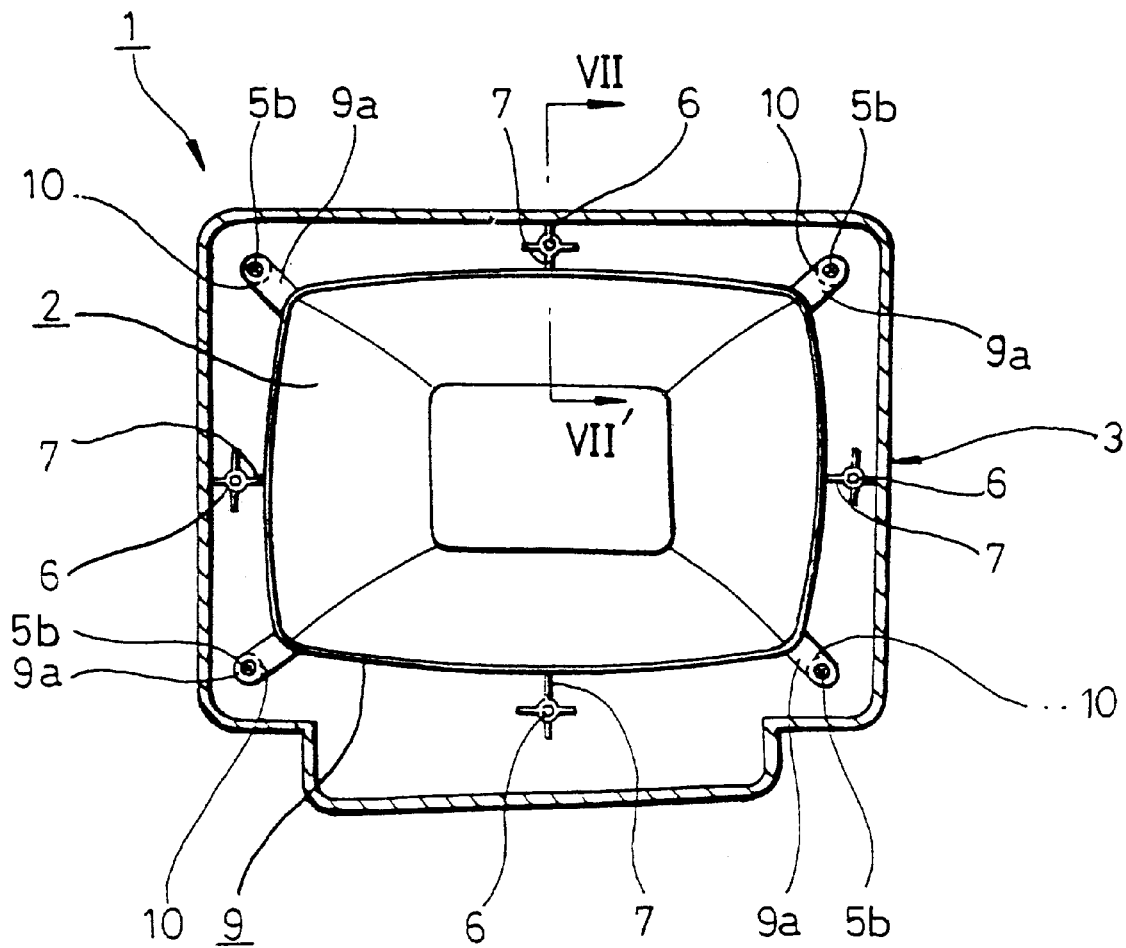
FIG. 4 is a perspective view of the fixing boss and deflection preventing rib shown in FIG. 3.
Figure 5:
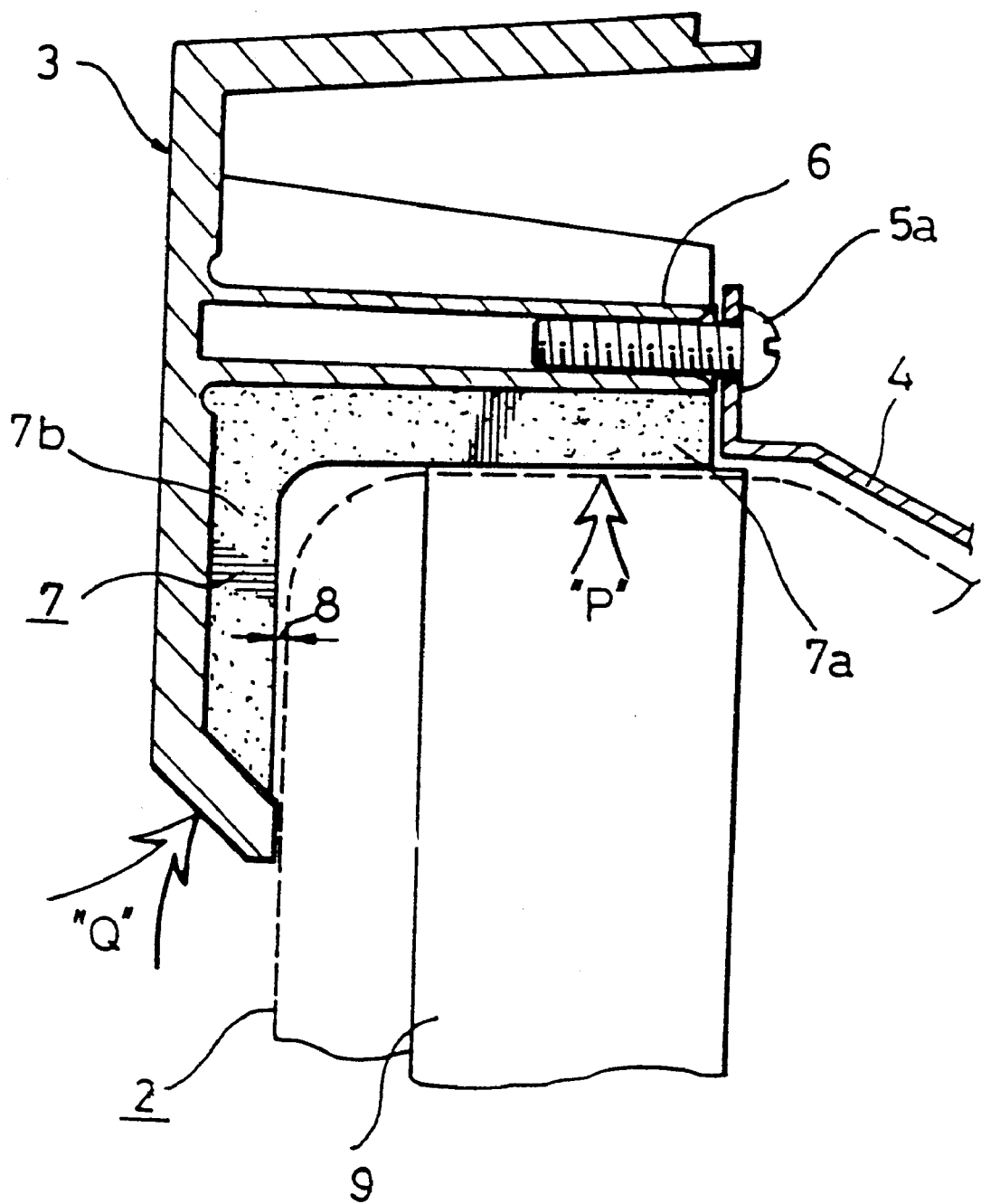
FIG. 5 is an view of the fixing boss and deflection preventing rib shown in FIG. 3.

As shown in FIGS. 4 and 5, each deflection preventing rib 7 is comprised of a first portion 7a and a second position 7b. Together, the first and second portions 7a and 7b form the same general curve (profile) as the CRT's outer surface.

Figure 6:
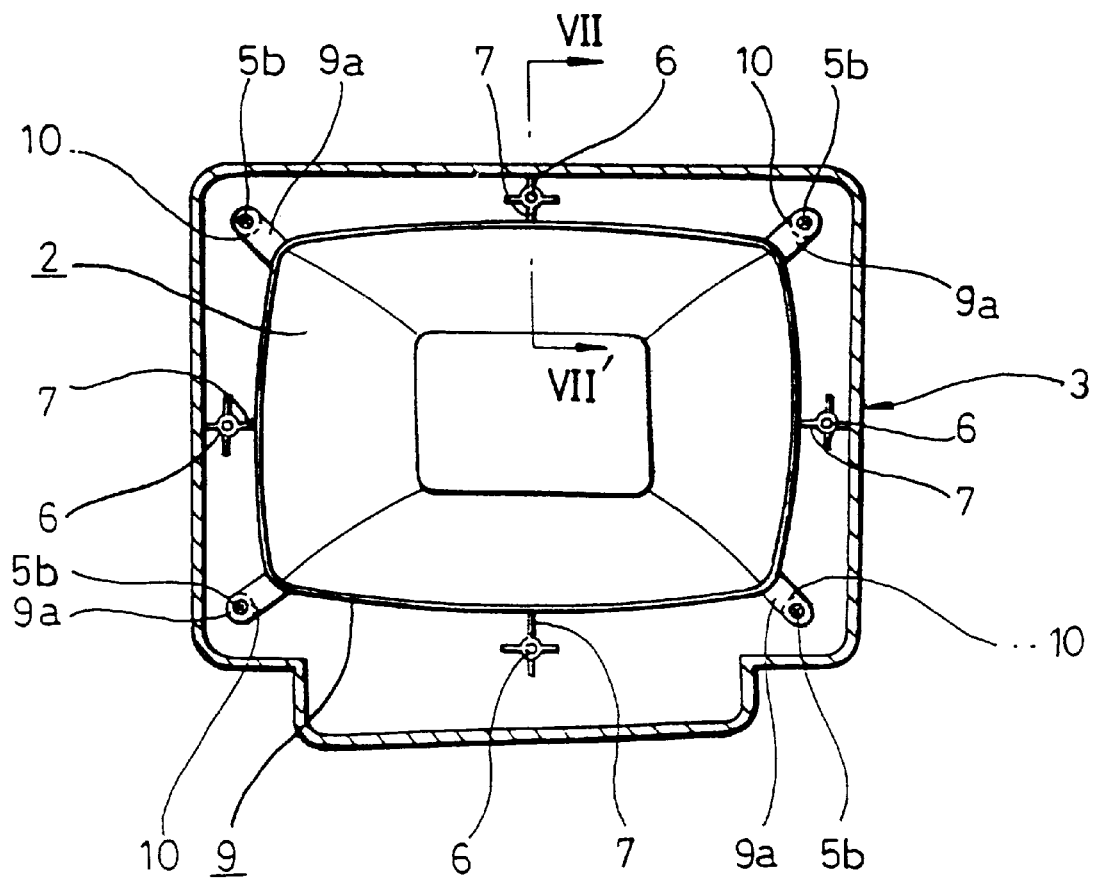
FIG. 6 is a rear view illustrating the assembly of the CRT and front case in accordance with the present invention.

Referring to FIG. 6, a CRT is mounted to the rear of front case 3, using second fixing screws 5b for securing CRT ears 9a to fixing bosses 10 at the corners of fixing band 9 for securing the CRT. To prevent an inward deflection of fixing boss 6, which occurs during an extrusion molding process in forming front case 3 or under an environmental change of temperature or humidity, deflection preventing rib 7 supports a designated portion of the fixing band 9.

Figure 7:
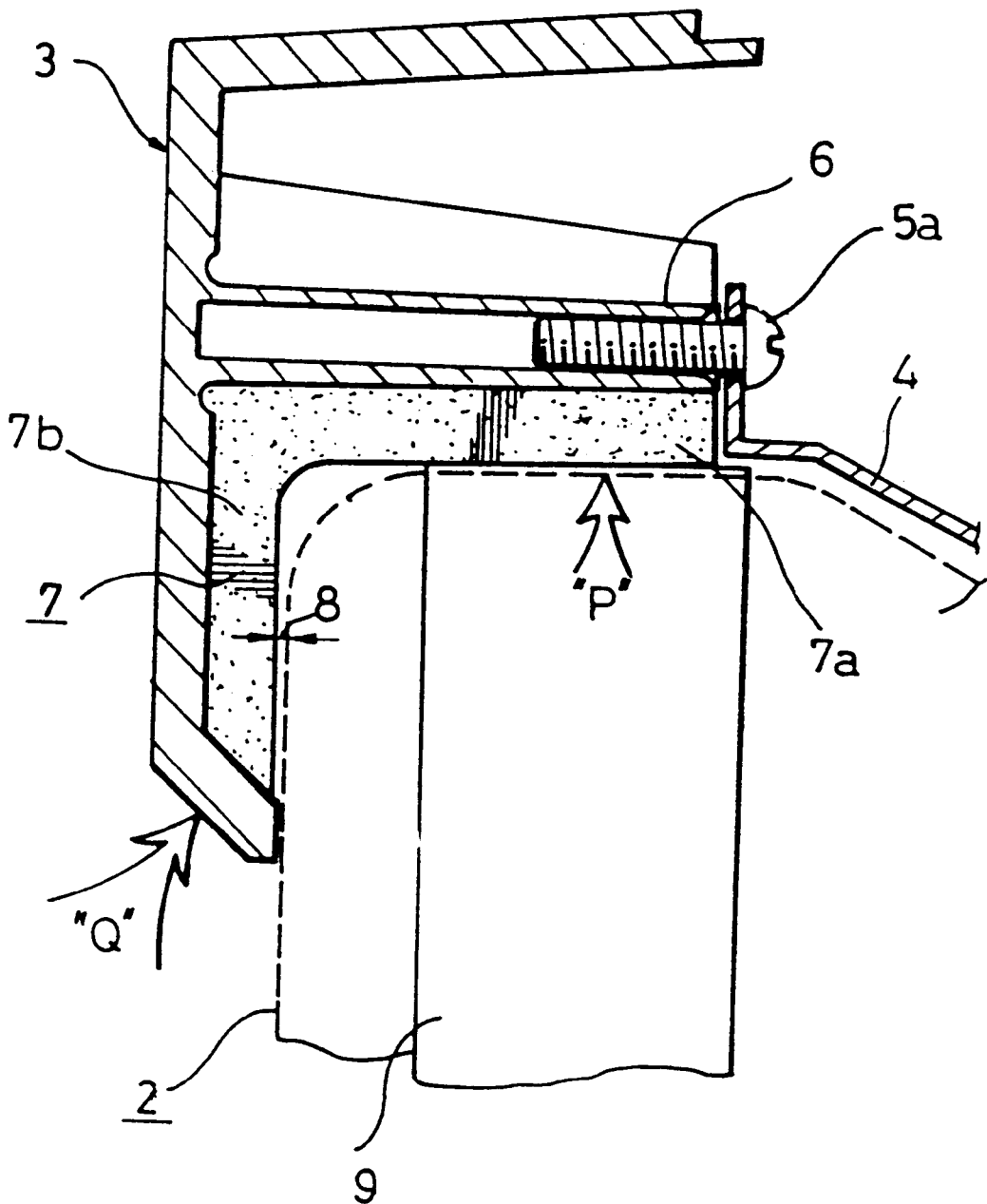
FIG. 7 is a cross-sectional view along line VII–VII' of FIG. 6.

In more detail, as shown in FIG. 7, the presence of fixing band 9 securing CRT 2 imposes a force P against the deflection preventing rib 7 along its first portion 7a. In doing so, the second portion 7b of deflection preventing rib 7 is affected by a force Q acting towards the CRT 2, to thereby press the CRT contact surfaces 11 against the CRT's front surface. Further, following the extrusion molding precess of the front case 3, as the deflection preventing rib 7 itself is cooled, the second portion thereof shrinks in the "Q" direction, effectively sealing the gap between CRT 2 and front case 3.

The fixing boss 6 and deflection preventing rib 7 integrally formed at the anterior portion of the front case 3, have a 0.5–0.7 mm gap from the exterior surface of the CRT 2.

The present invention is characterized by the fixing boss 6 of the front case 3, each including at least two deflection preventing ribs 7 (according to screen size) to control the degree of front case deflection more effectively. Also, the deflection preventing ribs 7 prevent the front case 3, having the CRT 2 installed therein, from being deflected under the CRT's weight or environmental change. Therefore the gap between the CRT 2 and the front case 3 can be prevented by enhancing the strength of the anterior parts of the front case, to promote durability and maintain shape.

As described above, a CRT-type display device according to the present invention prevents the occurrence of a gap between the CRT and front case, thereby enhancing product appearance while guarding against intervening contaminants that may cause damage of failure and facilitating assembly by eliminating the heed to monitor torque requirements.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A display device having a cathode ray tube for displaying an image, comprising:
    a front case having a plurality of mounting bosses for connecting to the cathode ray tube and having four inner edges defining a display area in which said image generated by said cathode ray tube can be viewed;
    a rear case combining with said front case to enclose said cathode ray tube;
    a chassis enclosed in said front case and said rear case and attached to said cathode ray tube; and
    a plurality of deflection preventing ribs, formed along each of said four inner edges of said front case, for minimizing a gap between the cathode ray tube and said front case, said plurality of deflection preventing ribs each comprising:
        a plug extending from said front case and capable of being fastened to said chassis; and
        a first portion attached to said plug and having a curve matching an outer profile of said cathode ray tube, said curve substantially having an "L" shape.

2. The display device of claim 1, further comprising said first portion of each of said plurality of deflection preventing ribs being interposed between said cathode ray tube and said front case.

3. The display device of claim 2, said first portion of each of said plurality of deflection preventing ribs receiving a pressing force from the installation of the cathode ray tube.

4. The display device of claim 3, further comprised of the plug maintains a gap of about 0.5–0.7 mm between an outer surface of the cathode ray tube and said front case.

5. The display device of claim 3, further comprising each said plug deflecting away from said cathode ray tube when the plurality of deflection preventing ribs comes into contact with the cathode ray tube thus causing the four inner edges of said front case to move toward the cathode ray tube.

6. A display device having a cathode ray tube, comprising:
    a front case having a plurality of mounting bosses and having four inner edges defining a display area in which an image generated by said cathode ray tube can be viewed;
    a rear case combining with said front case to enclose said cathode ray tube;
    a plurality of deflection ribs each disposed along one of said four inner edges said deflection ribs each comprising:
        a plug; and
        a first portion attached to said plug and having a curve matching an outer profile of said cathode ray tube, said curve substantially having an "L" shape; and
    each plug on each of said plurality of deflection ribs deflecting away from said cathode ray tube when each first portion of each said plurality of deflection ribs contacts said cathode ray tube, thus causing said four inner edges of said front case to move towards said cathode ray tube.

7. The display device of claim 6, further comprising a chassis attached to said cathode ray tube.

8. The display device of claim 7, further comprised of each said first portion of each of said plurality of deflection ribs being interposed between said cathode ray tube said front case when said display device is assembled.

9. The display device of claim 8, further comprising said plurality of deflection ribs maintaining a gap of 0.50–0.7 mm between the cathode ray tube and the front case when the display device is assembled.

10. A display device having a cathode ray tube, comprising:
    a front case having four corners each having a mounting boss for connecting to said cathode ray tube and having four inner edges defining a display area in which an image generated by said cathode ray tube can be viewed;

a rear case combinable with said front case to enclose said cathode ray tube;

a plurality of ribs, each formed along one of said four inner edges of said front case, each of said plurality of ribs comprising:

a plug extending from said front case; and a first portion attached to said plug and having a curve matching an outer profile of said cathode ray tube, said curve substantially having an "L" shape; and said first portion of each of said plurality of ribs being interposed between said front case and said cathode ray tube to maintain a gap of about 0.5 millimeters to about 0.7 millimeters between an outer surface of said cathode ray tube and said four inner edges of said front case.

11. The display device of claim 10, further comprising a chassis enclosed in said front case and said rear case and attached to said cathode ray tube.

12. The display device of claim 11, further comprising each said plug deflecting away from said cathode ray tube when said plurality of ribs contact said cathode ray tube, thus causing the four inner edges of said front case to move toward said cathode ray tube.

13. The display device of claim 12, further comprised of said first portion of each of said plurality of ribs receiving a force from the installation of said cathode ray tube.

14. The display device of claim 13, further comprised of each said mounting boss being threaded for attachment to said cathode ray tube.

\* \* \* \* \*